US012518158B2

(12) United States Patent
Gomez et al.

(10) Patent No.: US 12,518,158 B2
(45) Date of Patent: Jan. 6, 2026

(54) TRAINING TRANSFORMERS USING SLICEOUT

(71) Applicant: Cohere Inc., Toronto (CA)

(72) Inventors: Aidan Gomez, Toronto (CA); Seoyeon Yoo, Toronto (CA)

(73) Assignee: Cohere Inc., Toronto (CA)

( * ) Notice: Subject to any disclaimer, the term of this patent is extended or adjusted under 35 U.S.C. 154(b) by 1084 days.

(21) Appl. No.: 17/531,612

(22) Filed: Nov. 19, 2021

(65) Prior Publication Data
US 2022/0164655 A1 May 26, 2022

Related U.S. Application Data

(60) Provisional application No. 63/116,548, filed on Nov. 20, 2020.

(51) Int. Cl.
G06N 3/08 (2023.01)
G06F 16/903 (2019.01)

(52) U.S. Cl.
CPC ......... G06N 3/08 (2013.01); G06F 16/90335 (2019.01)

(58) Field of Classification Search
CPC .......... G06N 3/08; G06N 3/0455; G06N 3/09; G06N 3/048; G06N 3/082; G06F 16/90335
See application file for complete search history.

(56) References Cited

U.S. PATENT DOCUMENTS 10,748,029 B2 8/2020 Jaderberg et al.
11,893,469 B2 * 2/2024 Wagner ................... G06N 3/02

2018/0225553 A1 8/2018 Ha et al.
2018/0300629 A1 * 10/2018 Kharaghani ........... G06N 3/084
2022/0067533 A1 * 3/2022 Jiao ....................... G06N 3/063
2022/0108162 A1 * 4/2022 Wagner .................... G06N 3/08

FOREIGN PATENT DOCUMENTS

CN 106779068 A * 5/2017

OTHER PUBLICATIONS

European Patent Office, Extended European Search Report, European Patent Application No. 21894108.6, Oct. 8, 2024, eight pages.
Ghiasi, G. et al. "DropBlock: A Regularization Method for Convolutional Networks." arXiv Preprint arXiv:1810.12890v1, Oct. 30, 2018, pp. 1-11.

(Continued)

Primary Examiner — April Y Blair
(74) Attorney, Agent, or Firm — CPST Intellectual Property Inc.; Brett J. Slaney

(57) ABSTRACT

A system for training the neural network using dropout with slicing operations preserves the regularization effects of dropout, while speeding up computations and reducing the memory requirements of training the neural network. Instead of randomly dropping weights connected to neurons in a neural network, the system slices contiguous memory segments of weight matrices. For transformer models, the approach first receives input data that consist of a sequence of elements. Based on the input data, input embedding vectors with positional encoding are generated. Then the transformer model is trained by passing the input embedding vectors through various neural network layers. While passing through linear layers, some of the weight matrices are sliced (e.g., masked) such that a contiguous section of a weight matrix is kept unsliced and used for training and the rest of the weight matrix is not accessed.

14 Claims, 11 Drawing Sheets

(56) References Cited

OTHER PUBLICATIONS

Ko, B. et al. "Controlled Dropout: A Different Dropout for Improving Training Speed on Deep Neural Network." 2017 IEEE International Conference on Systems, Man, and Cybernetics (SMC), Oct. 5-8, 2017, pp. 972-977.
Vaswani, A. et al. "Attention is All You Need." arXiv Preprint arXiv:1706.03762v1, Jun. 12, 2017, pp. 1-15.
Notin, P. et al. "SliceOut: Training Transformers and CNNs Faster While Using Less Memory." arXiv Preprint arXiv:2007.10909v1, Jul. 21, 2020, pp. 1-24.
PCT International Search Report and Written Opinion, PCT Application No. PCT/IB2021/000812, May 9, 2022, 12 pages.

\* cited by examiner

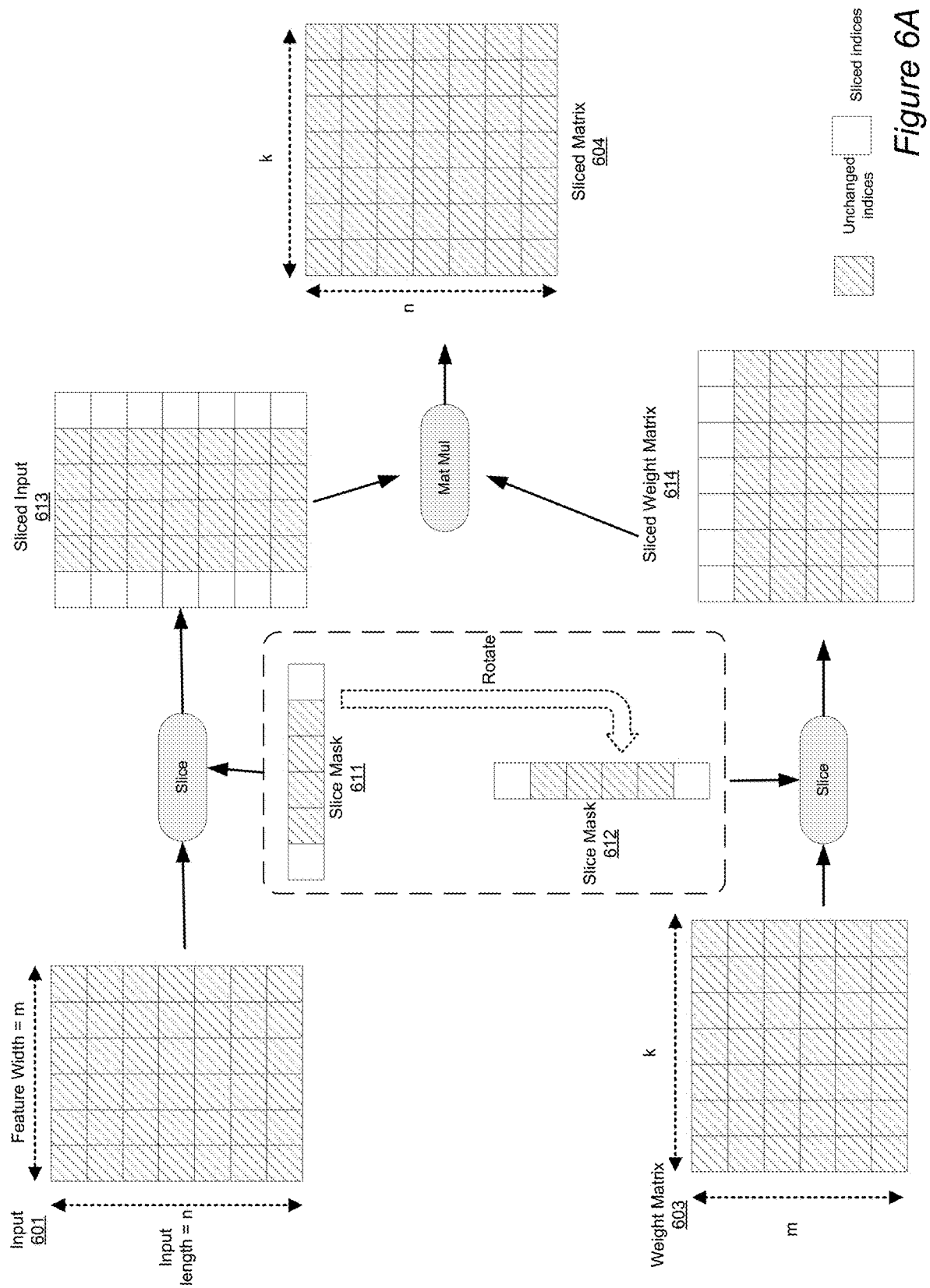

TRAINING TRANSFORMERS USING SLICEOUT

CROSS REFERENCE TO RELATED APPLICATIONS

This application claims priority under 35 U.S.C § 119(e) to U.S. Provisional Patent Application Ser. No. 63/116,548, entitled "Training Transformers Using Sliceout," filed Nov. 20, 2020. The subject matter of all of the forgoing is incorporated herein by reference in its entirety.

BACKGROUND

This disclosure relates generally to dropout in neural networks. More particularly, this disclosure relates to an efficient method for training a transformer model using dropout.

Neural networks with a large number of parameters are powerful in learning complicated relationships between inputs and outputs. However, deep neural networks also face the challenge of overfitting, such that the network learns the training inputs well but fails to effectively generalize to new data. Dropout is a regularization technique for addressing this problem. As typically applied, "dropout" randomly deactivates or "turns off" some neurons of a neural network to prevent overfitting. During training of the neural network, dropout randomly drops neurons by zeroing out the weights connected to them to prevent a neuron to be overly dependent on one another.

Although dropout achieves the goal of reducing overfitting, existing dropout implementation methods do not reduce memory requirement or computational complexity of training. In particular, in existing dropout implementations, the "turned off" units are still allocated to and remain in memory, maintaining training memory overhead that could potentially be optimized.

A transformer (also called a transformer model) is a type of neural network, often used for natural language processing. A transformer typically includes some number of "encoder" layers that generate a representation of an input, and a number of "decoder" layers which decode the representation to an output. Transformers are a state-of-the-art natural language processing model, but one disadvantage of the transformer model is considerable large memory requirement demanded by the model architecture. This is because transformers tend to improve their performance dramatically as the number of parameters increases. With existing dropout implementation, transformers still face the challenge of large memory requirement and high computational complexity.

SUMMARY

Neural networks, particularly transformers, are trained with reduced memory requirements and computational complexity. The training uses a unique implementation of dropout, which preserves the regularization effects of the standard dropout approach, while speeding up computations and reducing the memory requirements.

In one embodiment, instead of randomly dropping weights connected to neurons in a neural network, the training method slices contiguous memory segments of weight matrices by selecting a contiguous range of neighboring neurons and selecting weight matrices by row or by column. The method first uniformly samples a starting index of the slice. The sampled datapoints are restricted to a subset of eligible positions. For example, when slicing out columns of a weight matrix, the eligible starting positions may be the indices that are in the first row of a matrix and only those indices are eligible to be selected. The slice operation in some embodiments thus may modify the logical view into memory (for subsequent processing in training) but does not change physical memory for the underlying matrices. Accordingly, instead of replacing values in weight matrices with zeros as in tradition dropout implementation, the effective size of the neural network is reduced because it only 'sees' the weights within the sliced view. Therefore, the slicing operation may be seen as a mask that controls the logical view for weight matrices. After slicing the weight matrices, forward and backward passes are performed with the sliced weight matrices for a training batch of data. Then the corresponding values of the original weight matrices are updated in-place based on the updates from the training batch.

This approach may be particularly applied to the unique structure of transformer models. For example, in an attention mechanism of the Transformers, weight matrices associated with query, key and value matrices are sliced column or row wise. Scaling factors associated with score matrices are adjusted based on the dimensions of query and key matrices after the slicing operation. Weight matrices for linear layers in an attention module and in a feed-forward training module may be sliced and may need alignment. For example, each pair of query and key matrices in an attention module needs to take a dot product, so it is necessary that the sliced-out indices of each pair of query and key matrices are aligned.

This training process increases efficiency from several perspectives. From the computational perspective, it takes advantage of GPU memory layout as the slicing operation requires a single access to contiguous memory. From the memory perspective, the masked units (i.e., the "sliced" or "dropout" weights), that would physically remain in memory with standard dropout, are removed from memory overhead by the slicing operations. This implies a smaller memory footprint for weight gradients and activations throughout the network, and also results in matrix multiplications with smaller tensors compared to processing the standard-size model, such as is processed with traditional dropout approaches. As a result, larger models may be more effectively trained and a model of similar size may be trained with fewer computing resources.

BRIEF DESCRIPTION OF THE DRAWINGS

FIG. 6A-6C illustrate various embodiments for applying masks to input and weight matrices.

DETAILED DESCRIPTION

System Overview

Figure 1B:
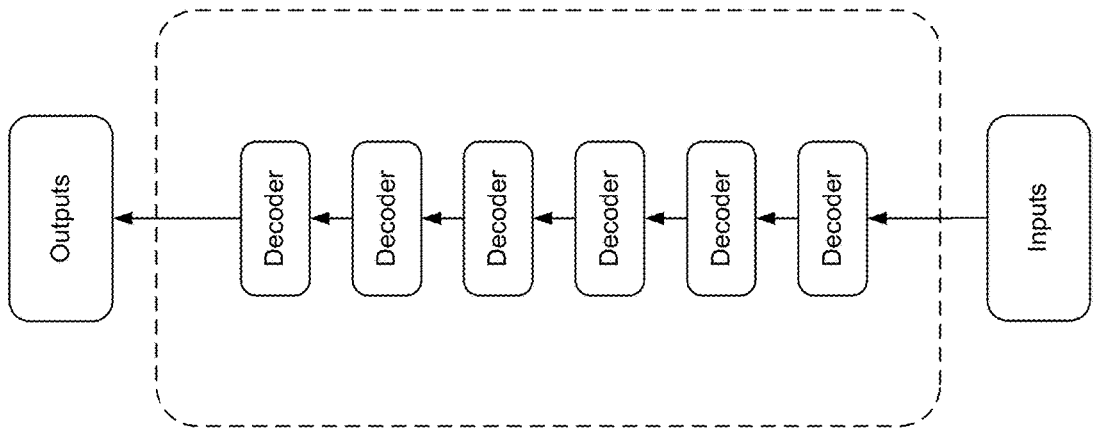
FIG. 1B illustrates an overall structure of another transformer model with only decoders, in accordance with another embodiment.
Figure 1A:
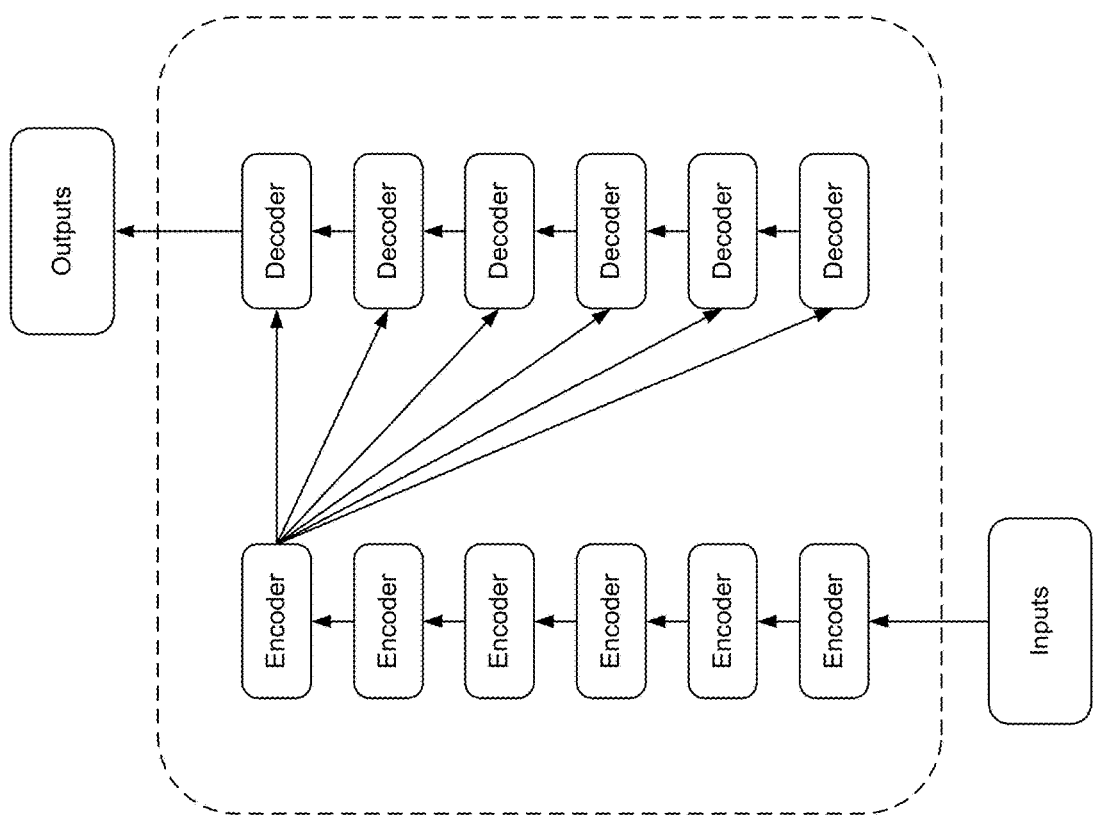
FIG. 1A illustrates an overall structure of a transformer model, in accordance with one embodiment.

FIG. 1A illustrates a high-level structure of a transformer model, according to one embodiment. A transformer model may be used in various applications, some of the examples include, but not limited to, machine language translations, auto conversation generator and context summarization. A transformer model takes a sequence of elements as input and produces probabilities associated with a number of predefined classes as output. For example, for a translation tool that is built based on a transformer model, the sequence of input elements may be a sentence such as "I love patents" and the output of the model may be "Amo las patentes" which is "I love patents" in Spanish. In another embodiment where an auto conversation generator is trained by a transformer model, the input may be "I love patents" and the output may be "Awesome, me too."

As illustrated in FIG. 1A the Transformer model may use an encoder-decoder architecture with an encoding component and a decoding component. An encoder may map an input sequence into an abstract representation describing relationships between the elements in the input sequence. A decoder functions similarly but has a slightly different structure that is discussed below. The encoding component may consist of multiple encoders stacking on top of each other and, similarly, the decoding component may consist of a stack of multiple decoders. In another embodiment, the Transformers model may only have a decoder component as illustrated in FIG. 1B.

Figure 2:
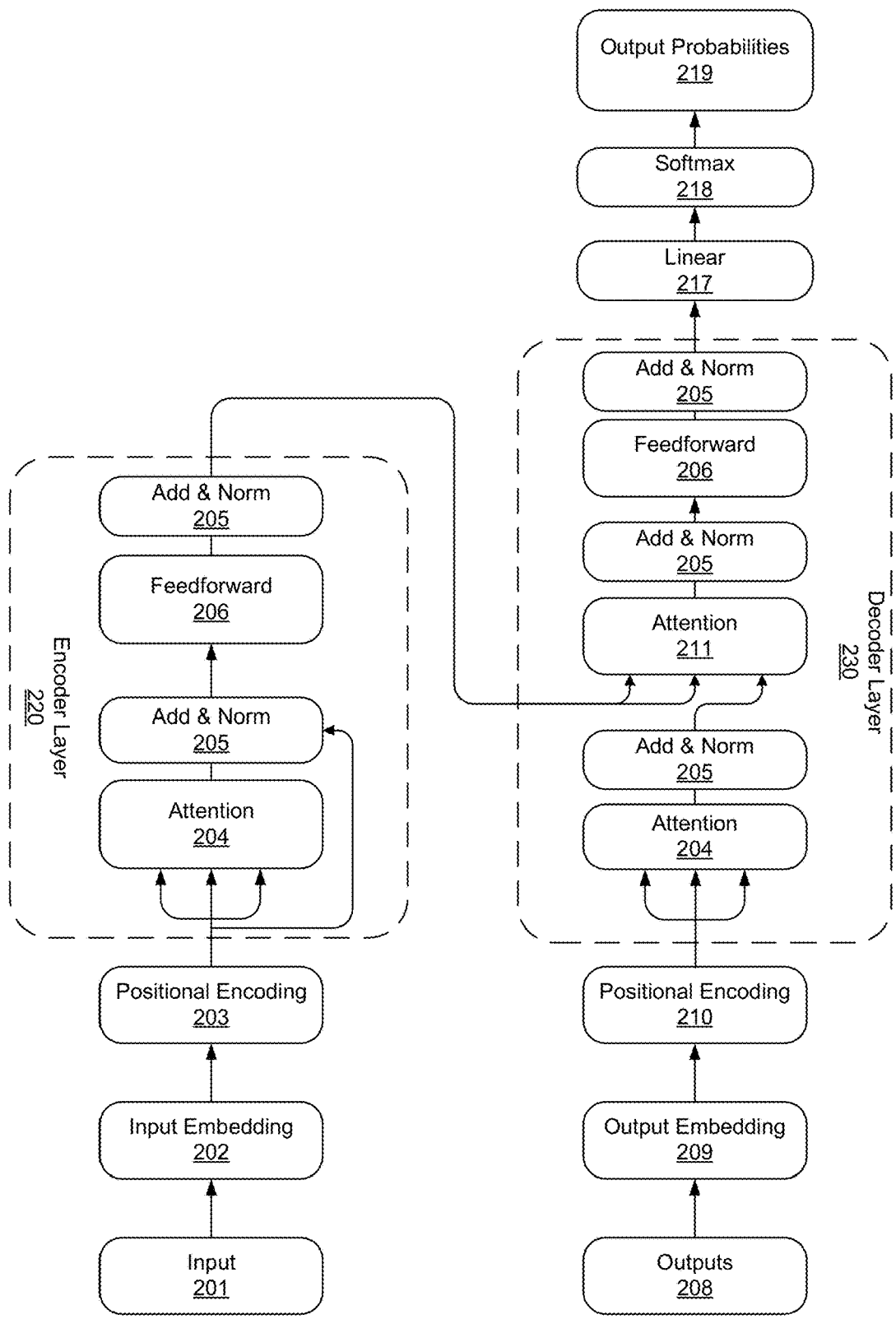
FIG. 2 is a flow chart that illustrates a detailed structure of a standard transformer model, in accordance with one embodiment.

FIG. 2 illustrates an example transformer model according to one embodiment. The input 201 of the transformer model may be a sequence of ordered elements. For example, the input 201 may be a sentence from a document or an ordered set of words. The input 201 may be passed through an input embedding module 202 which generates input embeddings that represent the input 201 as numerical vectors in latent space. Input embedding module 202 compresses information into fixed length vectors instead of having the input represented by a large-scale but sparse vector that is based on the whole English Dictionary which consists more than 100,000 words. Referring back to the previous example, the input 201 may be "I love patents" and each word may be embedded into a numerical vector of length 512. That is each word is mapped into a space of dimension 512 and is represented by a vector with 512 numerical values. As a result, the sentence "I love patents" is mapped into a matrix with three vectors of length 512. The positional encoding module 203 receives the inputs and generates positional information to be associated with the input embeddings, so that each individual element has an associated representation and positional information. Because the input 201 is an ordered list of elements, each element has its respective positional information describing its position in the ordered list. The positional encoding module 203 encodes this information in the input embedding vectors and outputs input embedding vectors with positional information encoded. For example, suppose input is a sentence with five words and each word is embedded into a vector of length 512. As a result, the output from the input embedding module 202 is a 5 by 512 matrix, with each word represented by a vector of length 512 with continuous numerical values. The positional encoding module 203 may further add one or more positional encoding values to each vector.

The size of the outputs from positional encoding module 203 may vary based on the number of the input 201, and the variable-sized vectors outputted from positional encoding module 203 may be subsequently passed through an encoder component and a decoder component. Because each encoder of the stack of encoders share identical structure, the encoder layer 220 in FIG. 2 illustrates an example of one of potentially multiple encoders. Similarly, the decoder layer 230 in FIG. 2 also illustrates one example of many decoders.

Encoders and decoders in some embodiments share a similar structure. Two of the core modules for encoders and decoders are attention module 204 and feedforward module 206. On a high level, the attention module 204 associates each individual word in the input to other words in the input. The attention module 204 may take input embeddings as input and may produce numerical vectors representing learned relational information describing how each word is associated with other words in the input. The feedforward module 205 contains a fully connected feedforward network, which is applied to each input element separately and identically. Details with regard to the attention module and the feedforward module are discussed below.

Each attention module 204 and feedforward module 206 are followed by an add & norm module 205. The add & norm module 205 is a residual connection and layer normalization module, which adds the output from attention module 204 to the input of the attention module 204 and conducts a layer normalization of the sum. The add & norm module 205 may help stabilize the hidden state dynamics in networks and may reduce training time.

Referring to FIG. 2, decoder layer 230 may also contain a self-attention module 204, a second attention module 211, and a feedforward module 206 followed by add & norm module 205. In one embodiment, a decoder layer 230 receives outputs 208 as part of its input. For example, if the task is to translate "I love patents" to "Amo las patentes," input 201 is "I love patents" while outputs 208 is "Amo las patentes." The encoder layer 220 learns information regarding how each English word associates with each other while the attention module 204 in the decoder layer 230 learns how each Spanish word associates with each other. Then the second attention module 211 learns how each English word associates with each Spanish word.

The structure of a decoder layer 230 is different from the structure of an encoder layer 220 in that the decoder layer 230 has a second attention module 211 which takes part of the outputs from the encoder layer 220 as input. Another difference between the encoder layer 220 and the decoder layer 230 is the attention module 204. In training the attention module 204, the decoder layer 230 may apply a look-ahead mask to score matrices to make sure each element in the sequence only has access to elements that are in front of it in the sequence and does not have information flow backwards. This is to preserve the auto-regressive property of the decoder layers.

The decoder layer 230 produces vectors with continuous numerical values as output. That is, the output from the decoder layer 230 contains information describing how each element of the input 201 and the output 208 associate with each other and how each element of the output 208 associate with other elements in the output 208. The output from the decoder layer 230 may be further passed through a linear layer 217 for final processing such as a transformation in dimension of the decoder outputs so that the outputs are ready to be passed to the subsequent softmax layer 218. The softmax layer 218 produces probability scores between 0 and 1 that indicate a likelihood of the next element in the ordered list being classified as one of many of pre-defined classes. For example, the number of pre-defined classes may be 10,000, and each class represents a possible word in a corpus. The output probabilities 219 may be a vector of length 10,000, associating each of the pre-defined classes with a probability score. The output probabilities 219 may determine that a certain class (in this example, a certain word) has the highest probability of being the next word in the sentence.

In yet another embodiment, the transformer model may contain only a stack of decoders, as illustrated in FIG. 1B. Details with regard to this architecture are discussed below and illustrated in FIG. 3.

Training a Transformer Model with Slicing Operations

Figure 3:
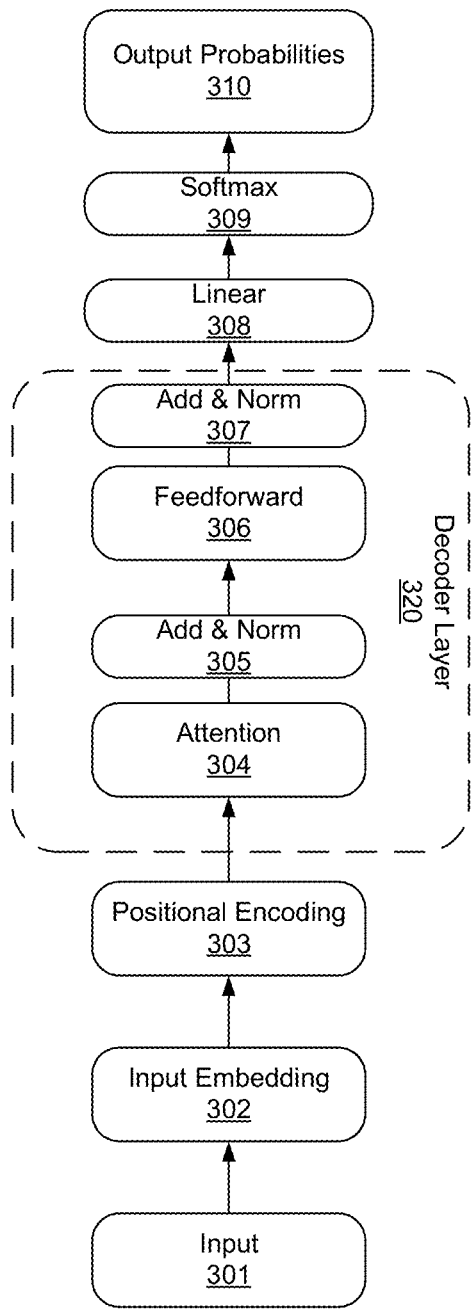
FIG. 3 illustrates a transformer model with only decoders, in accordance with one embodiment.
Figure 4:
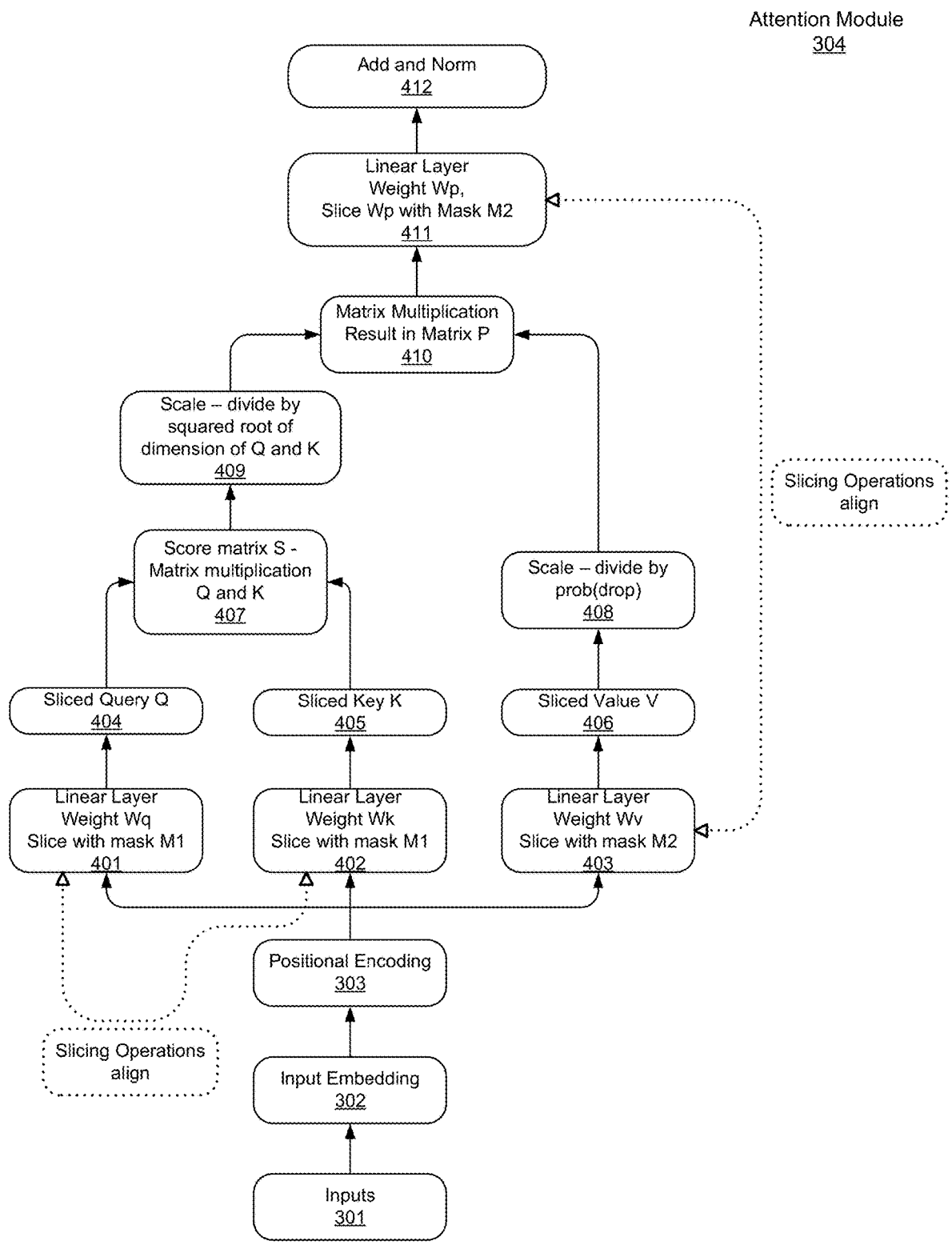
FIG. 4 is a flow chart illustrating a detailed attention module of a sliced transformer model, in accordance with one embodiment.
Figure 5:
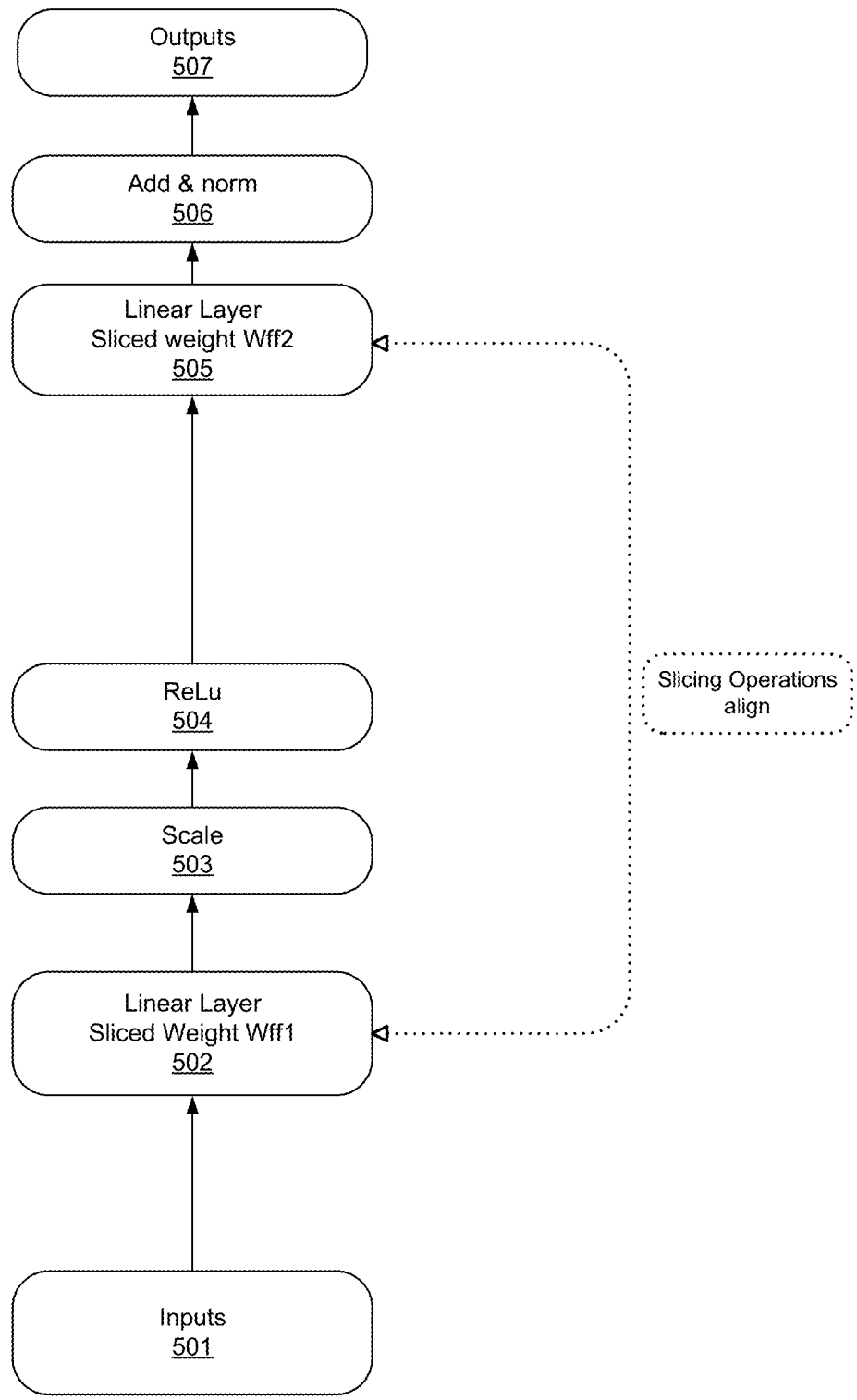
FIG. 5 is a flow chart illustrating a feedforward mechanism of a sliced transformer model, in accordance with one embodiment.

FIG. 3 illustrates an example decoder structure of a transformer model with only decoders. In this embodiment, the decoder 320 only consists one masked attention module 304 and a feed forward module 306. The masked attention module 304 is similar to the attention module 204 in FIG. 2, where the masked attention module 304 masks future outputs therefore blocking information from the sequenced outputs that are after the position being calculated. The system feeds inputs 301 to an input embedding module 302, where inputs 301 are embedded into input embeddings. The input embeddings are further encoded with positional information through the positional encoding module 303. Output from the positional encoding module 303 are fed into a decoding component consisting of decoder layers 320. The decoder layer 320 contains two core modules, an attention module 304 and a feedforward module 306. FIG. 4 illustrates the addition of slicing (or "masking") operations for improving training of the models for the attention module 304 and FIG. 5 illustrates adding slicing operations for the feedforward module 306. In another embodiment, the slicing operations may be also applied to the attention modules 204 and 211 and the feedforward module 206 in the embodiment described in FIG. 2.

Referring to FIG. 4, the attention module 304 takes output from the positional encoding module 303 as input and trains the model with three distinct linear layers 401-403. The linear layers 401-403 are trained to generate a query matrix, a key matrix and a value matrix. On a high level, the concept of the query, key and value matrices is analogous to a retrieval system, where the query matrix represents what kind of information is needed, and the key and value matrices represent a set of key-value pairs that contain the actual content. The query, key and value matrices are trained by linear transformation layers through different weight matrices. If the input 201 contains N elements, then the trained query, key and value matrices may also contain N vectors where each vector is mapped to a latent vector space represented by continuous numerical values. In other words, each element in the input 201 is mapped to a set of query, key and value vectors. The linear layer 401 is associated with a weight matrix Wq, the linear layer 402 is associated with a weight matrix Wk and the linear layer 403 is associated with a weight matrix Wv.

To reduce the memory and computational requirements during training, one or more training batches may "slice" or "mask" portions of the input matrices and the weight matrices. While in traditional dropout methods where random values of weights matrices are replaced with zeros, this method slices the weight matrices Wq, Wk and Wv along with input embedding vectors by accessing only a contiguous section of the weight matrices and the input matrices (e.g., the unmasked portions) and ignoring the rest of the matrices (e.g., the masked or 'sliced' portions). The output from the linear layers 401-403 are sliced query matrix 404, sliced key matrix 405 and sliced value matrix 406. The input matrices are sliced column wise so that they preserve at least some features for each input element instead of removing all features for one input element completely. Randomly slicing some features for each input element may preserve the regularization effect while reducing computational complexity and memory requirement. On the other hand, the weight matrices may be sliced through various embodiments illustrated in FIGS. 6A-6C to reduce computational complexity. The weight matrices may also be sliced to a proper dimension so that multiplication with input matrices is possible. The slicing operations are discussed below with further detail.

Figure 6B:
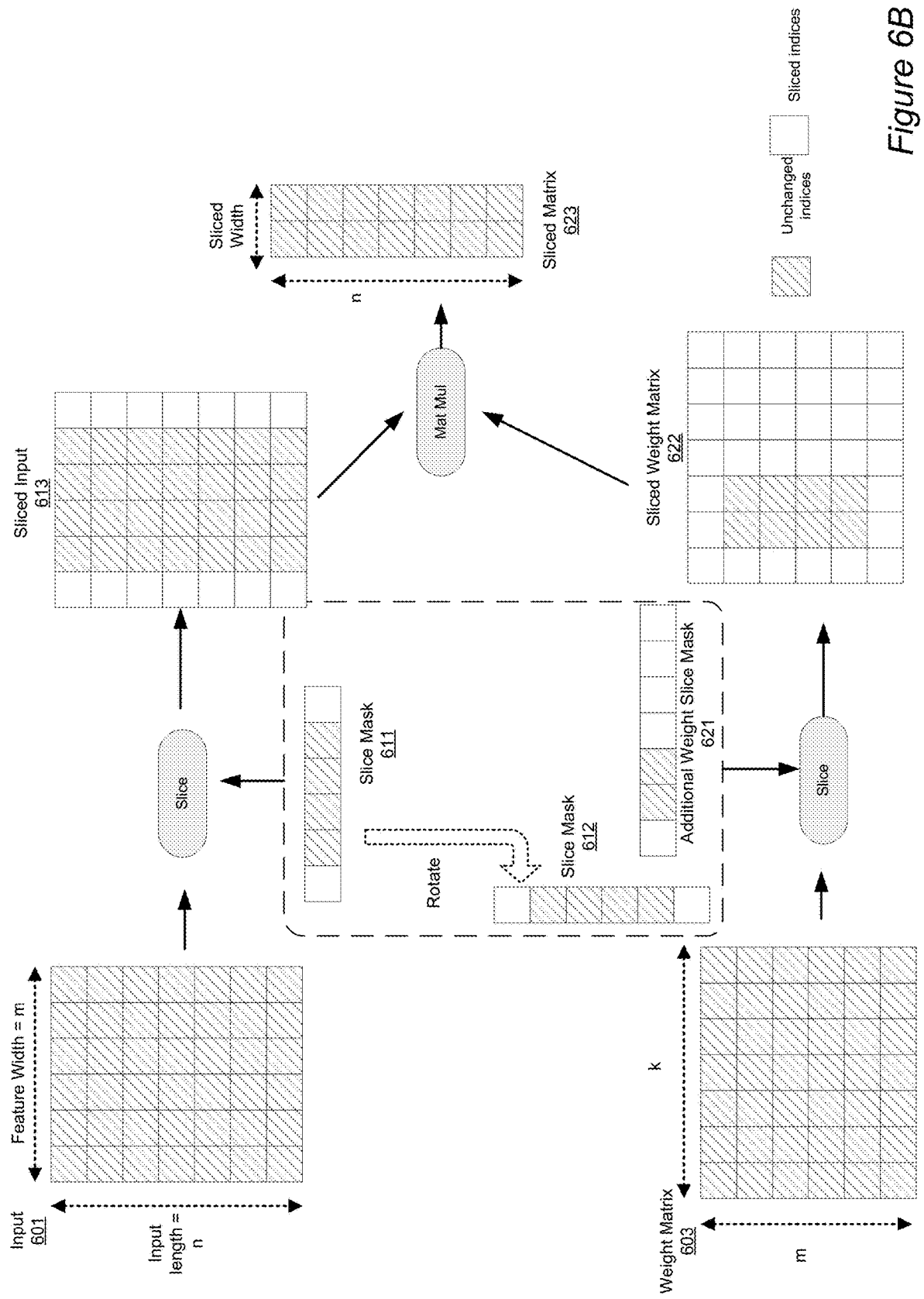
Figure 6C:
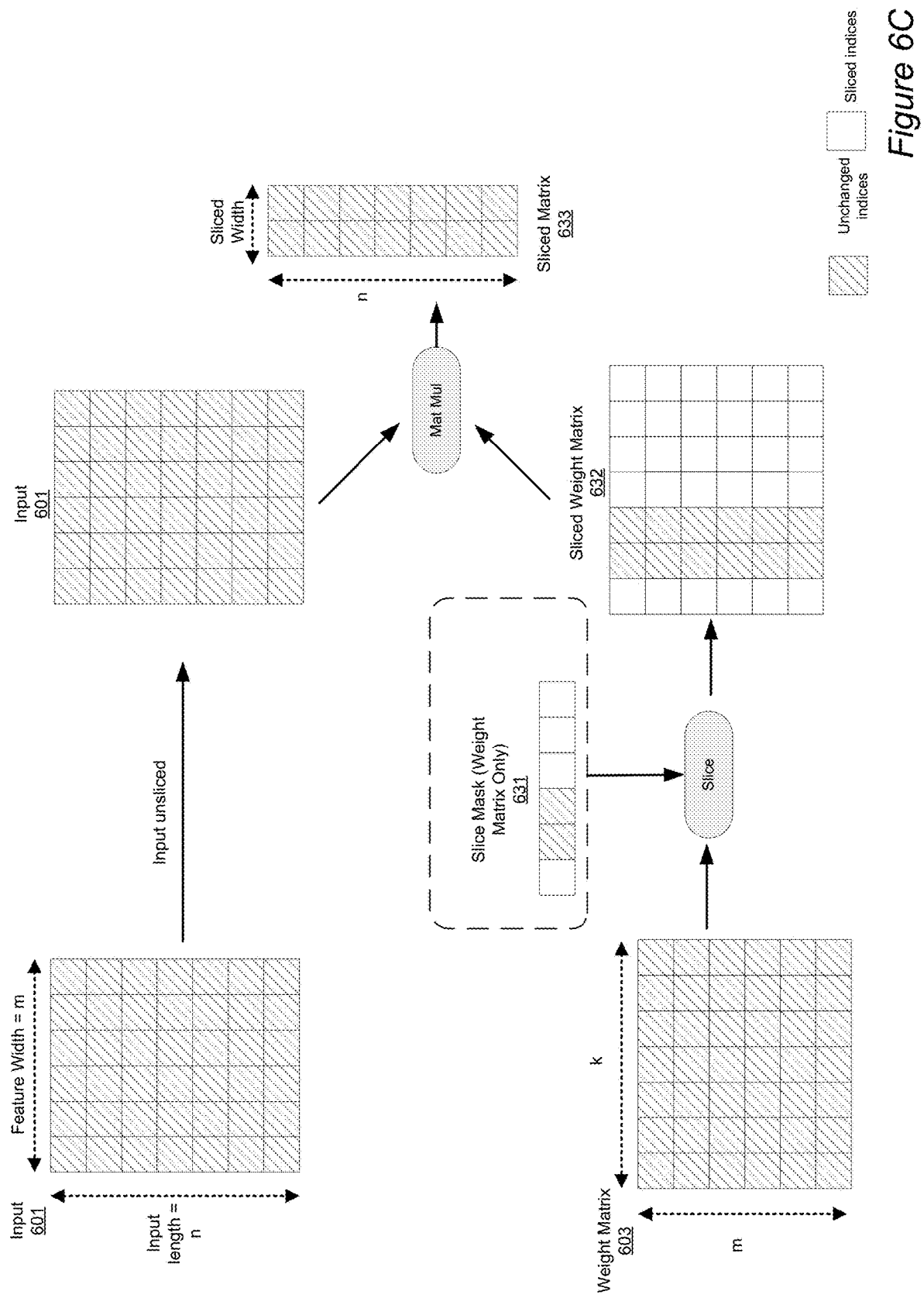

FIGS. 6A-6C illustrate the slicing operations, such as the ones in the training of linear layers 401-403 and 411 to generate sliced query, key, and value matrices, according to one embodiment. For example, in FIG. 6A, the input data is represented by input matrix 601, which in some embodiments is generated by concatenating feature vectors generated by each element of an input sequence. In this example, the input matrix 601 has an input length of n, because the input has n elements in the original input 301. Each input element is represented by a feature vector of length m. The feature vectors for the input elements are thus concatenated to generate the input matrix 610 in one embodiment.

Weight matrix 603 represents a weight matrix for the relevant set of weights (e.g., the query weight matrix, query key matrix, or query value matrix) before the slicing operation. The weight matrix 603 includes a dimension that matches the length of the feature vector of the input matrix 601. The weight matrix may include an additional dimension (here, k) of elements including additional weights for the weight matrix 603.

To generate the sliced matrices, including sliced input 613 and sliced weight matrix 614, a slice mask 612 is applied to the respective input matrix and weight matrix. The slice mask as shown in FIG. 6A is a one-dimensional mask corresponding to the feature width of the feature vectors associated with the input. The slice mask defines a beginning index and an ending index for slicing the relevant matrix dimension. The ending index may alternatively be described with a length of the slice mask. In this example, the slice mask 611 is applied to the feature width of the input 601, which has a length of six. The slice mask in this example begins at the second element and ends at the fifth element of the vector, having a length of four.

The slice mask is applied to the input matrix 601 to generate sliced input 613, in this example by applying the slice mask 611 to each input element feature vector (i.e., each row of the input matrix). As shown in the example of FIG. 6A, sliced input matrix 613 thus slices the input matrix 601 according to the slice mask 611 and removes the first and last columns of the input matrix 601 when generating the sliced input 613. In some embodiments, the sliced input 613 and sliced weight matrix 614 are not constructed in memory, and instead when the matrices are used, the mask is applied to construct a logical view of the relevant input matrices (e.g., a logical view of input matrix 601 or weight matrix 603).

In this example, the sliced input 613 and sliced weight matrix 614 are multiplied to generate a sliced matrix 604. As shown, the sliced matrix 604 may not have a dimension related to the feature width that was sliced by the slice mask (i.e., dimension m). According, the slice mask 611 is rotated to apply the slice mask 612 to the dimension corresponding to the feature width in the weight matrix 603. Stated another way, slice mask 612 is a rotation of slice mask 611 because in matrix multiplication each row vector in the input matrix 613 conducts a dot product with each column vector in the weight matrix 614. Therefore, the number of columns in the sliced input matrix 613 needs to align with the number of rows in the sliced weight matrix 614. This is achieved by rotating the slice mask and applying it to the dimension of the weight matrix corresponding to the feature width of the input elements.

By applying the slice mask 611 to each row of the input matrix 601, a sliced input matrix 613 is generated which is illustrated with the shaded area starting from the second column (starting index is 2) and consisting of 4 columns (length is 4) and this sliced sub-matrix is used in the training. Similarly, the weight matrix 603 is sliced with slice mask 612 which is a rotation of the slice mask 611. The sliced weight matrix 614 is generated by applying the slice mask 612 to each column of the weight matrix 603, resulting in a sliced matrix 614. Finally, the sliced input 613 and sliced weight matrix 613 conduct a matrix multiplication and a sliced matrix 604 is generated. During this process, only the sliced input matrix and the weight matrix may be used in the training. As the slicing operations only change the logical view into the matrices, it is possible to preserve the regularization effect while reducing computational complexity and memory requirements. As a contrast, in a traditional dropout implementation, the dropped weights are replaced with zeros and the model may still be trained with a full matrix, processing the full matrix with the replacement zero values. Although the traditional implementation provides regularization, it is less efficient from a computational perspective and a memory saving perspective.

Referring to FIG. 6B, an additional weight slice mask 621 may be applied to the weight matrix, in accordance with another embodiment. The additional weight slice mask 621 may be a mask that is applied to each row of the weight matrix 603. As a result of the slice mask 612 and the additional slice mask 621, the weight matrix 603 is sliced and a sliced weight matrix 622 is generated with the number of rows equal to the dimension of the slice mask 612 and the number of columns equal to the dimension of the additional weight slice mask 621. The sliced input 613 is multiplied by the sliced weight matrix 622 resulting in a sliced matrix 623. The embodiment illustrated in FIG. 6B may reduce more computational complexity and memory requirement comparing with the embodiment illustrated in FIG. 6A, as a result of the additional weight slice mask.

FIG. 6C illustrates another embodiment of the slicing operation where a slice mask is only applied to the weight matrix 603 and the input 601 remains unsliced. In this embodiment, a slice mask 631 is applied to each row of the weight matrix 603, resulting in a sliced weight matrix 632. The unsliced input matrix 601 is multiplied by the sliced weight matrix 632 resulting in a sliced matrix 633.

One unique feature regarding applying the slicing operation to the transformer models is that the slicing operation associated with linear layer 401 aligns with the slicing operation associated with linear layer 402 as illustrated in FIG. 4. In other words, the starting index and the length of the masks associated with the query weight matrix 602 and the key weight matrix 603 are always the same. This is because the slicing operations for query weight matrix and key matrix need to align to generate score matrix S 407 by multiplying the sliced query matrix 404 and the sliced key matrix 405. Because the matrix multiplication is a dot product matrix multiplication, it is necessary that the sliced indices of the query matrix and the key matrix are aligned.

Continuing with FIG. 4, multiplication 407 of the sliced query matrix 404 and the sliced key matrix 405 results in a score matrix 407 which may be a n-by-n matrix, where n is the number of elements in the inputs 301. The score matrix S may represent how much focus each element should put on every other element in the inputs 301. Each element may have a score with respect to every other element, and the higher the score, the more the focus. Although the query and key matrices are sliced to generate the sliced query Q 404 and sliced key K 405, the resulting score matrix S 407 thus may still have the same dimensions as when created by the unsliced matrices.

The score matrix S may be scaled 409 by an adjusted temperature value, which is the squared root of the dimension of the sliced key matrix 405 and the sliced query matrix 404. That is, S is divided by $\sqrt{d_k}$ where $d_k$ is the dimension of the sliced key matrix 405 and the sliced query matrix 404. Note that $d_k$ is the dimension of the key and query matrices that are used for calculating the score matrix S. In the scenario where the key and the query matrices are unsliced, $d_k$ may be the dimension of the complete key and query matrices. The scaling step 409 may allow for a more stable gradients, since multiplying large-scale matrices may have an exploding effect because for large values of $d_k$, the dot product of two large-scale vectors may grow large in magnitude, which may push softmax functions into regions where gradients are extremely small resulting in a stagnating learning process. Therefore, scaling the score matrix S with a scaling factor of $$\frac{1}{\sqrt{d_k}}$$

may counteract this effect.

Shifting focus to the rightmost branch of FIG. 4, in training the linear layer 403, a value weight matrix Wv is similarly sliced, and a sliced value matrix 406 is generated using the sliced value weight matrix Wv. The input for the linear layer 403 is the same as the input for the linear layers 401 and 402. However, the slicing operation associated with value matrices does not need to align with query and key matrices.

The sliced value matrix 408 is similarly scaled by a scaling factor. For example, the sliced value matrix may be divided by the expected proportion of the weight matrix kept unsliced out during training. In other words, the scaling factor may be the ratio of the number of values kept in the weight matrix to the total number of all values. This scaling step 408 helps stabilize the following matrix multiplication step 410.

The scaled score matrix outputted from the scaling step 409 is multiplied 410 by the scaled value matrix outputted from the scaling step 408, resulting in an output matrix P. The output matrix P passes through another linear layer 411 for processing. The slicing operation in training the linear layer 411 should also align with the slicing operation in training the linear layer 403. That is, it is important that the linear layer 403 has the same slicing indices as the linear layer 411. Output from the linear layer 411 goes through one more add & norm layer 412 and finally reaches the feedforward module 306.

The feedforward module 306 is illustrated in detail in FIG. 5. The feedforward module 306 contains two linear layers 502 and 505 with a ReLU activation 504 inbetween. Outputs from the attention module 304 are fed as inputs 501 into the feedforward module 306. Inputs 501 first go through a linear layer 502 which is associated with a weight matrix $W_{ff1}$. The weight matrix $W_{ff1}$ and the inputs 501 are similarly sliced as the query, key and value matrices. The system first uniformly samples a starting index and determines a length for the slice. Then, only the sliced contiguous section of the input matrix and the weight matrix may be accesses and used in computations. Outputs from the linear layer 502 further pass through a scaling module 503 that has an identical functionality as the scaling module 408 in the attention module 304. For example, the scaling module 503 may apply a scaling factor that is the ratio of the number of values kept unsliced in the weight matrix to the total number of all values. After scaling, the output matrix further passes through a ReLU layer for better performance.

Outputs from the ReLU layer may then go through another linear layer 505 with a sliced weight matrix $W_{ff2}$. The slice masks associated with the linear layer 505 should align with the slice masks associated with linear layer 502. Outputs from the second linear layer 505 pass through a final add & norm layer 506 and outputs 507 are produced, which concludes the decoder layer 320.

Now referring back to FIG. 2, the output from the decoder layer 230 may further pass through a linear layer 217 for final processing. Output from the final linear layer 217 goes through a softmax layer 218. The softmax layer 218 produces probability scores between 0 and 1. The probability scores indicate a likelihood of the next element in the ordered list being classified as one of many of pre-defined classes. For example, the number of pre-defined classes may be 10,000, and each class represent a possible word in a corpus. The output probabilities 219 may be a vector of length 10,000, associating each of the pre-defined classes with a probability score. The output probabilities 219 may determine that a certain class, or in this case, a certain word has the highest probability of being the next word in the sentence.

Figure 7:
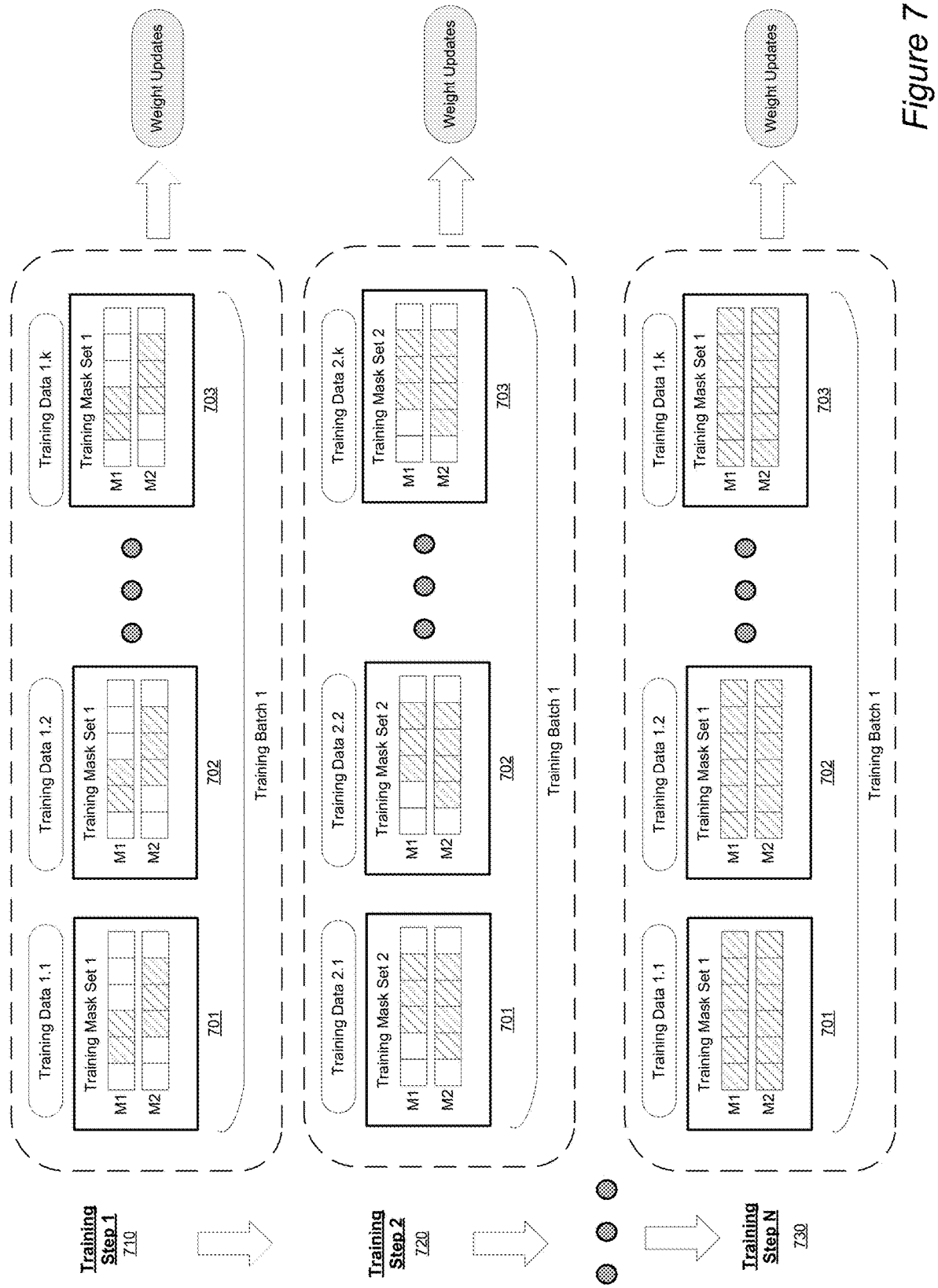
FIG. 7 illustrates an overall process of training a transformer model in batches, in accordance with one embodiment.

In one embodiment, the training process of the Transformers may take a number of steps to reach a desired result. As illustrated in FIG. 7, the training process may consist of N training steps including training step one 710, step two 720 and a number of steps until the last training step N 730 which may return a desirable result. The training may be conducted in batches, where each batch may be a subset of the total training data. As illustrated in FIG. 7, step one 710 may be trained with training batch 1 including k training data samples and step two 720 may be trained with training batch 2 including a different set of k training data sample. At each training step, the training data batch is applied to the current model and an error is determined and evaluated with respect to an optimization function. The model weights are updated to reduce the error of the model weights based on the error of each training item in the batch. E.g., the training step may use a gradient descent optimization to determine an optimization of the weights relative to the training data as applied to the current model weights. In this example, as the weights were sliced with the training masks, the weight update evaluates and updates only those weights that were kept in the sliced matrices (i.e., the masks did not remove them from the sliced matrices).

Each batch may have a different slicing pattern or mask. For example, training batch one 801 trains the model using training data batch 1 which are randomly selected from the whole training dataset and a first training mask set. Similarly, training batch two 802 may use a different batch of the training data and a different training mask set. As shown in FIG. 7, in this example the masks M1 and M2 in training step 1 may have a different pattern from the M1 and M2 in training step 2. As noted above, at each step, the weights which were not removed by the slice masks are updated at each step. Accordingly, applying different masks to different training batches may train different subsections of the overall model as defined by the slice masks applied to the unsliced matrices. The slice masks may be selected for each training batch such that every part of the unsliced matrices is trained and updated. Stated another way, the masks may be selected for the training phases such that future training phases apply different masks than prior phases and may vary the applied mask to distribute (in one embodiment, evenly distribute) which portions of the matrices are masked.

To generate the slice masks, the model training system samples a starting index for the mask out of a subset of eligible positions and may further uniformly sample a length of the slice. In one embodiment, eligible positions may be indices of elements in the input matrix to generate a first mask for an input matrix. In other embodiments, eligible positions may be indices of elements in the first column or may be indices indicated by the model. After a starting index is determined, a length of the slice is used to determine the size of the slice. In some embodiments, the model training system generates a set of training masks to be used at each training step, each of which may differ from one another and may be sampled from the possible starting index and may similarly vary in length. For example, in FIG. 6A, the eligible positions for starting a mask may be indices of the elements in the first row of the input matrix 601. These eligible positions may be randomly sampled (i.e., selected with the same probability). One of the eligible positions may be randomly selected as the starting index. Based on the starting index, a length may be further randomly selected. For example, if a starting index 2 is randomly selected, then a length may be randomly selected from 1 to 5 (based on the number of remaining elements in the matrix). As shown in FIG. 6A, the slice mask 611 is generated as a result of a starting index of 2 and a length of 4.

Returning to FIG. 7, each training step, excluding the first step, may use the trained weight matrices from its previous steps. In one embodiment, the final training steps, such as training step N 730 may apply no mask, allowing the earlier training steps to regularize the model more quickly with reduced processing requirements. These training steps that do not apply a slice mask may fine tune the model using all the training data without applying any slicing operations or masks to the weight matrices. For example, as illustrated in FIG. 7, training step N maybe one of the last steps of the training process and step N is trained with full weight matrices without dropping any values. Stated another way, some batches in the training may use sliced matrixes according to different masks to regularize training of the model with various masks, while additional batches may be used to "fine tune" the model with an unmasked/unsliced training batch. The fine-tuning steps may be able to learn more accurate updates to parameters because these steps use all training data which is all information that is available for the training process. However, training with the whole dataset may require more computing resources. Fine tuning only the final steps towards the end of the training and applying the slicing operations to previous training steps may reduce computational complexity and save computing resources.

In other embodiments, unmasked training phases may be applied at other portions of the training process, for example at the beginning of the training process to initialize the weight matrices across the entire weight matrices. The unmasked training phase may then be followed by training batches in which portions of the matrices are masked to regularize the weight matrices. In a further embodiment, the training process may begin with one or more training phases without masks, apply masks/matrix slicing as discussed above to one or more training phases, and apply further training phases without masks at the end of the model training to fine tune the model as noted.

Figure 8:
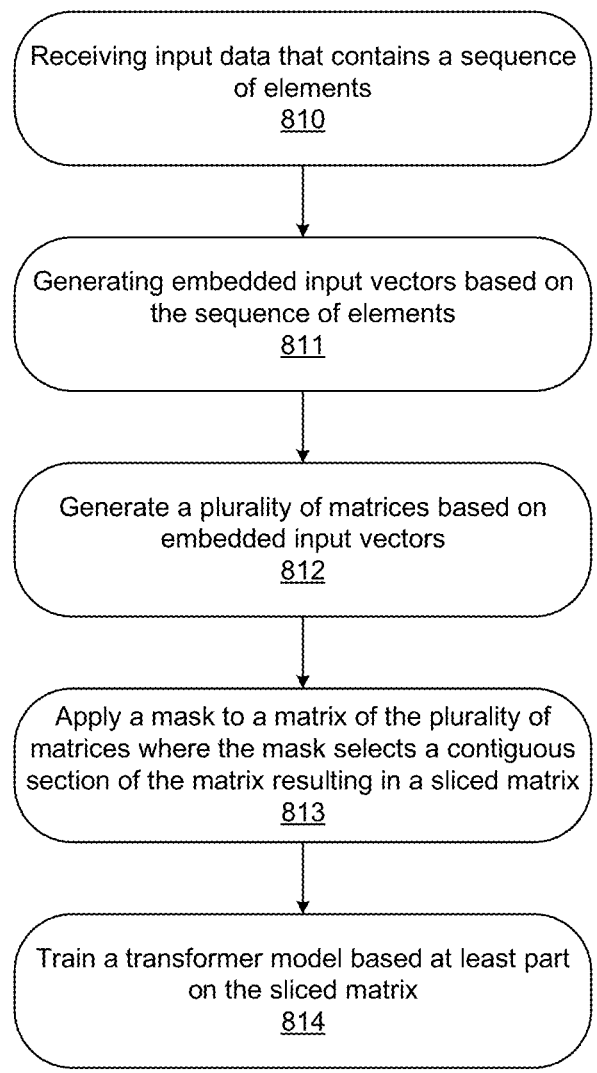
FIG. 8 is a flow chart depicting the process of training a transformer model with slicing operation.

FIG. 8 is a flow chart illustrating the process of training a transformer model with slicing operations. The model first receives 810 data that contains a sequence of ordered elements as input. Input embedding vectors are generated 811 based on the sequence of elements such that the input elements are embedded into numerical vectors. The input embeddings are passed through a number of neural network layers where a plurality of matrices are generated 812 including a plurality of weight matrices. A mask is applied 813 to at least one of the plurality of generated matrices, such as one or more weight matrices. The mask selects a contiguous section of the matrix resulting in a sliced matrix that is smaller in size comparing to the original matrix. The transformer model may be trained with a number of steps with a number of batches, where different batches may be applied with different masks. The transformer model is trained 814 based at least on one of the sliced matrices.

Figure 9:
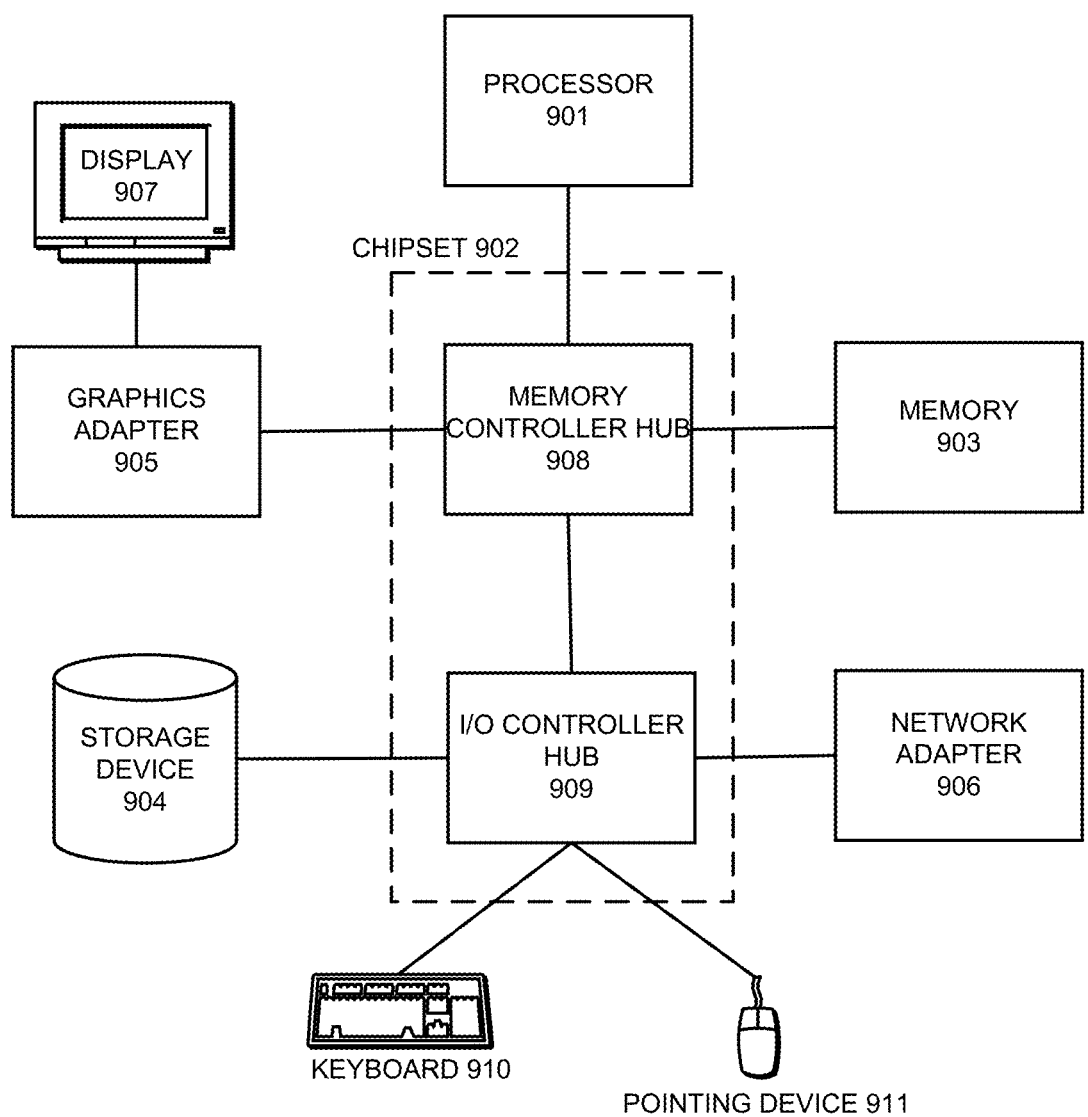
FIG. 9 is a high-level block diagram illustrating physical components of a computer.

FIG. 9 is a high-level block diagram illustrating physical components of a computer used as part or all of the embodiments described previously for training a transformer model with slicing operations, according to one embodiment. Illustrated are at least one processor 901 coupled to a chipset 902. Also coupled to the chipset 902 are a memory 903, a storage device 904, a graphics adapter 905, and a network adapter 906. A display 907 is coupled to the graphics adapter 905. In one embodiment, the functionality of the chipset 902 is provided by a memory controller hub 908 and an I/O controller hub 909. In another embodiment, the memory 903 is coupled directly to the processor 901 instead of the chipset 902.

The storage device 904 is any non-transitory computer-readable storage medium, such as a hard drive, compact disk read-only memory (CD-ROM), DVD, or a solid-state memory device. The memory 903 holds instructions and data used by the processor 901. The graphics adapter 905 displays images and other information on the display 907. The network adapter 906 couples the computer 900 to a local or wide area network.

As is known in the art, a computer 900 can have different and/or other components than those shown in FIG. 9. In addition, the computer 900 can lack certain illustrated components. In one embodiment, a computer 900 acting as a server may lack a graphics adapter 905, and/or display 907, as well as a keyboard or pointing device. Moreover, the storage device 904 can be local and/or remote from the computer 900 (such as embodied within a storage area network (SAN)).

As is known in the art, the computer 900 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 904, loaded into the memory 903, and executed by the processor 901.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for training a transformer model comprising:
receiving input data, the input data containing a sequence of elements;
generating embedded input vectors based on the input data;
generating a plurality of matrices based on the embedded input vectors;
applying a mask to a matrix of the plurality of matrices, the mask selecting a contiguous section of the matrix resulting in a sliced matrix, wherein obtaining the sliced matrix includes a single access to contiguous memory, wherein the plurality of matrices comprise a query weight matrix, a key weight matrix and a value weight matrix, and wherein applying the mask to the matrix of the plurality of matrices comprises:
applying a first mask to the query weight matrix, resulting in a sliced query weight matrix;
applying a second mask to the key weight matrix, resulting in a sliced key weight matrix;
applying a third mask to the value weight matrix, resulting in a sliced value weight matrix;
applying a fourth mask to the embedded input vectors, resulting in a sliced input matrix;
training a plurality of linear layers based on the sliced query weight matrix, the sliced key weight matrix, the sliced value weight matrix and the sliced input matrix; and
generating a sliced query matrix, a sliced key matrix and a sliced value matrix; and
training the transformer model based at least in part on the sliced matrix by:
training the transformer model with a first subset of data of the input data using a first mask set; and
training the transformer model with a second subset of data of the input data using a second mask set, wherein the second subset of data is different from the first subset of data and the second mask set is different from the first mask set.

2. The method of claim 1, wherein the first mask aligns with the second mask.

3. The method of claim 1, further comprising:
multiplying the sliced query matrix with the sliced key matrix, resulting in a score matrix; and
scaling the score matrix based on a first dimension of the sliced query matrix and a second dimension of the sliced key matrix.

4. The method of claim 1, further comprising:
training an attention layer based on the plurality of matrices; and
training a feed-forward layer based on an output from the attention layer.

5. The method of claim 4, wherein the feed-forward network further comprises a first feed-forward linear layer and a second feed-forward linear layer with a rectified linear unit (ReLu) activation between the first and the second feed-forward linear layers.

6. The method of claim 5 further comprising applying a first feed-forward network mask to the first feed-forward linear layer and a second feed-forward network mask to the second feed-forward linear layer, the first feed-forward network mask aligned with the second feed-forward network mask.

7. The method of claim 1, wherein a starting index of the contiguous section of the matrix is uniformly sampled.

8. A non-transitory computer-readable storage medium comprising computer program code, the computer program code when executed by a processor causing the processor to perform steps comprising:
receiving input data, the input data containing a sequence of elements;
generating embedded input vectors based on the input data;
generating a plurality of matrices based on the embedded input vectors;
applying a mask to a matrix of the plurality of matrices, the mask selecting a contiguous section of the matrix resulting in a sliced matrix, wherein obtaining the sliced matrix includes a single access to contiguous memory, wherein the plurality of matrices comprise a query weight matrix, a key weight matrix and a value weight matrix, and wherein applying the mask to the matrix of the plurality of matrices comprises:
applying a first mask to the query weight matrix, resulting in a sliced query weight matrix;
applying a second mask to the key weight matrix, resulting in a sliced key weight matrix;
applying a third mask to the value weight matrix, resulting in a sliced value weight matrix;
applying a fourth mask to the embedded input vectors, resulting in a sliced input matrix;
training a plurality of linear layers based on the sliced query weight matrix, the sliced key weight matrix, the sliced value weight matrix and the sliced input matrix; and
generating a sliced query matrix, a sliced key matrix and a sliced value matrix; and
training the transformer model based at least in part on the sliced matrix by:
training the transformer model with a first subset of data of the input data using a first mask set; and
training the transformer model with a second subset of data of the input data using a second mask set, wherein the second subset of data is different from the first subset of data and the second mask set is different from the first mask set.

9. The non-transitory computer-readable storage medium of claim 8, wherein the first mask aligns with the second mask.

10. The non-transitory computer-readable storage medium of claim 8, further comprising:
multiplying the sliced query matrix with the sliced key matrix, resulting in a score matrix; and
scaling the score matrix based on a first dimension of the sliced query matrix and a second dimension of the sliced key matrix.

11. The non-transitory computer-readable storage medium of claim 8, further comprising:
training an attention layer based on the plurality of matrices; and
training a feed-forward layer based on an output from the attention layer.

12. The non-transitory computer-readable storage medium of claim 11, wherein the feed-forward network further comprises a first feed-forward linear layer and a second feed-forward linear layer with a rectified linear unit (ReLu) activation between the first and the second feed-forward linear layers.

13. The non-transitory computer-readable storage medium of claim 12 further comprising applying a first feed-forward network mask to the first feed-forward linear layer and a second feed-forward network mask to the second feed-forward linear layer, the first feed-forward network mask aligned with the second feed-forward network mask.

14. The non-transitory computer-readable storage medium of claim 8, wherein a starting index of the contiguous section of the matrix is uniformly sampled.

* * * * *